United States Patent [19]

Matsui et al.

[11] Patent Number: 4,600,038

[45] Date of Patent: Jul. 15, 1986

[54] ENGINE PART

[75] Inventors: Minoru Matsui; Takao Soma, both of Nagoya, Japan

[73] Assignee: NGK Insulators, Ltd., Japan

[21] Appl. No.: 452,969

[22] Filed: Dec. 27, 1982

[30] Foreign Application Priority Data

Oct. 25, 1982 [JP] Japan .................................. 57-186071

[51] Int. Cl.⁴ .............................................. F16L 9/14
[52] U.S. Cl. ..................................... 138/140; 138/149; 138/177; 428/68; 428/594; 123/41.84
[58] Field of Search .............. 138/140, 137, 172, 177, 138/149, 178; 123/41.83, 41.84; 29/156.4 WL; 428/594, 68; 384/276, 277; 92/169, 170, 171

[56] References Cited

U.S. PATENT DOCUMENTS

| 1,597,249 | 8/1926 | Riley | 138/140 X |
| 1,825,678 | 10/1931 | Pittman | 138/140 |
| 2,198,149 | 4/1940 | Bangert | 138/140 X |
| 2,745,437 | 5/1956 | Comstock | 138/140 |
| 3,456,690 | 7/1969 | Weed | 138/140 |
| 3,832,273 | 8/1974 | O'Connor | 138/140 |
| 4,199,010 | 4/1980 | McGath et al. | 138/140 |
| 4,538,562 | 9/1985 | Matsui et al. | |

Primary Examiner—James E. Bryant, III
Attorney, Agent, or Firm—Parkhurst & Oliff

[57] ABSTRACT

An engine part comprises a plurality of ceramic members overlaid one on the other and including at least a first ceramic member with a front surface to be in contact with hot gas and a second ceramic member arranged behind the first member, each of the first member and the second member has a mechanical strength of more than 20 kg/mm².

13 Claims, 4 Drawing Figures

ENGINE PART

BACKGROUND OF THE INVENTION

1. Field of the invention

This invention relates to an engine part, and more particularly to a highly durable ceramic engine part with excellent heat insulation, heat resistance, and mechanical strength. The "engine part" here refers to a constituent member of an engine, such as a cylinder, a cylinder head, a piston, a precombustion chamber, a port liner, and the like.

2. Description of the Prior Art

These years, from the standpoint of energy saving(s), considerable research and development efforts have been made to improve the thermal efficiency of reciprocating piston engines, such as Diesel engines and spark ignition engines, by using a high engine operating temperature. To operate an engine at a high temperature the engine parts must be made of a heat insulating material with excellent heat resistance. With heat-resistance metals, which have been utilized in making engine parts in general, it has been very difficult to raise the engine operating temperature in excess of the conventional practice due to the limitation of the heat resistance of the metallic material. Recently, a number of studies have been reported which propose engine parts having insulating layers formed of ceramic members with excellent heat insulation, heat resistance, and mechanical strength.

However, the thus proposed engine parts with insulating layers made of conventional ceramic material have a serious shortcoming in that the ceramic members of the engine parts are susceptible to breakage due to generation of a large thermal stress in low-temperature portion thereof in excess of the mechanical strength thereof, because a large temperature difference is generated between the hot portion of the ceramic member exposed to the combustion chamber and the outer low-temperature portion thereof. The large temperature difference is caused by the small amount of heat transfer through the engine parts due to the high heat insulation of the ceramic member and the unitary structure of the heat insulating ceramic member itself.

SUMMARY OF THE INVENTION

Therefore, an object of the present invention is to obviate the above-mentioned shortcoming of the prior art by providing an improved engine part.

Another object of the invention is to provide a highly durable engine part with excellent heat insulation, heat resistance, and mechanical strength.

A preferred embodiment of the engine part of the invention comprises a plurality of ceramic members overlaid one on the other and including at least a first ceramic member with a front surface adapted to be exposed to hot gas and a second ceramic member arranged behind the first ceramic member, each of the first and second ceramic members having a mechanical strength of more than 20 kg/mm$^2$.

The inventors carried out a series of studies on the structure of heat-insulating layers made of ceramic members with the aim of reducing the thermal stress a low-temperature portions thereof so as to prevent the ceramic members from being broken by the thermal stress, and found out that if an overlaid structure or laminated structure is formed in composite ceramic member by using ceramics with a high mechanical strength, in excess of a certain valve, the thermal stress generated at the low-temperature portion of the ceramic members is lowered so as to reduce greatly the risk of breakage of the ceramic member thereby. The invention is based on such findings of the inventors.

Thus, an outstanding feature of the present invention is in that a heat insulating ceramic layer of an overlaid or laminated structure is formed by using a plurality of ceramic members with a specific mechanical strength, so that a highly durable engine with an excellent thermal shock resistance and a high heat insulation is provided by using such that insulating ceramic layers.

Examples of the engine parts according to the present invention are cylinders, cylinder heads, pistons, precombustion chambers, port liners, and other parts which are exposed to generation and stream of hot gas in reciprocating piston engines, i.e., Diesel engines and spark ignition engines.

BRIEF DESCRIPTION OF THE DRAWINGS

For a better understanding of the invention, reference is made to the accompanying drawings, wherein.

Throughout different views of the drawings, 1 is a first ceramic member, 2 is a second ceramic member, 3 is a third ceramic member, 4 is a lubricating layer, and 5 is a metallic member.

DESCRIPTION OF THE PREFERRED EMBODIMENTS

The detailed structure of the engine part according to the present invention will be described by referring to an embodiment disclosed in FIG. 1, which shows a schematic vertical sectional view of a cylinder wall of a reciprocating piston engine according to the invention. The wall of the cylinder is composed of a laminated structure having a first ceramic body 1 forming an inner layer with a front surface adapted to be in contact with hot gas and a second ceramic member 2 secured to a rear or outer surface of the first ceramic member 1 and preferably made of the same material as that of the first ceramic member 1. The material of the first ceramic member 1 must have a mechanical strength of more than 20 kg/mm$^2$, preferably and than 40 kg/mm$^2$, more preferably more than 30 kg/mm$^2$ at 500° C. Examples of such material are zirconia, silicon nitride, sialon, silicon carbide, alumina, and the like.

Figure 1:
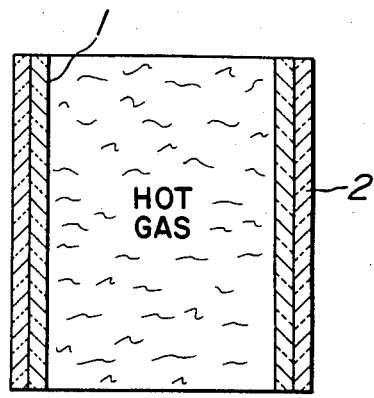
FIG. 1 is a schematic vertical sectional view of a cylinder as an embodiment of an engine part according to the present invention.

The laminated structure of FIG. 1 is formed most preferably by shaping separately and machining the first ceramic member 1 and the second ceramic member 2 so as to give them a thickness of more than 1 mm, preferably in a range of 2–10 mm, and then fitting the thus formed ceramic members one on the other. What is meant by "fitting" here is to combine tightly two or more structural members into one body. For example one member is fitted within and secured tightly to the other member by shrinkage fitting, pressure fitting and the like.

Regarding the material of the ceramic members, the above-mentioned materials are preferable, because such ceramics as zirconia, silicon nitride, sialon, alumina, and the like have a small heat conductivity, for example less than one half of that of cast iron which is a typical metallic material used in engine parts. Thus, such ceramic materials are desirable to use in the invention because the degree of heat insulation is inversely proportional to the heat conductivity. Additionally the above-referenced ceramics have a melting point of above 1,900° C. which represents a heat resistance of about twice as high as that of cast iron. Despite heat insulation which is similar to that of cast iron, silicon carbide can be used in the present invention because its melting point is as high as 2,700° C. and it has a high mechanical strength at high temperatures. Among the above-mentioned materials, zirconia is the most preferable ceramic to use for the ceramic heat insulating layer in the engine part of the invention, because it has a heat conductivity of less than 0.01 cal/cm·sec·°C., representing more than ten times the heat insulation valve of metallic materials, a melting point of 2,600° C. representing excellent heat resistance, and a coefficient of thermal expansion of $10 \times 10^{-6}$/° C. which is similar than that of cast iron, so as to provide excellent mating with cast iron.

Figure 2:
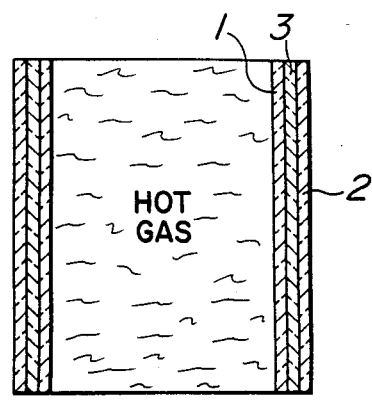
FIGS. 2, 3 and 4 are schematic vertical sectional views of other cylinders embodying the present invention.

Although the embodiment of FIG. 1 shows a cylinder made of only the first ceramic member 1 and the second ceramic member 2 combined in an overlaid or laminated way, it is also possible to form the engine part of the invention in a three-layer overlaid or laminated structure as shown in FIG. 2. More particularly, the embodiment of FIG. 2 uses a third ceramic member 3 which is disposed between the first ceramic member 1 with a front surface adapted to be in contact with hot gas the second ceramic member 2 to be secured to the rear surface of the first ceramic member 1, so as to provide a more perferable structure capable of further reducing the thermal stress in engine parts.

In the three-layer structure to be used in the invention, the position of the third ceramic member 3 is not restricted to that between the first ceramic member 1 and the second ceramic member 2; namely, the third ceramic member 3 may be disposed on the opposite surface of the second ceramic member 2 to the first ceramic member 1. In the case of an engine part which has an overlaid or laminated ceramic structure fitted onto the inner surface of a metallic body, the third ceramic member 3 can be precoated on the inner surface of the metallic body as a ceramic lining layer thereon.

An important feature of the invention is that more than three ceramic layers can be overlaid or laminated in an engine part according to the present invention. However, when a plurality of ceramic layers in excess of three layers are overlaid or laminated in the engine part, at least the first and second ceramic members 1 and 2 must have a mechanical strength of more than 20 kg/mm², and the plurality of the ceramic members should preferably be made of the same material.

Figure 3:
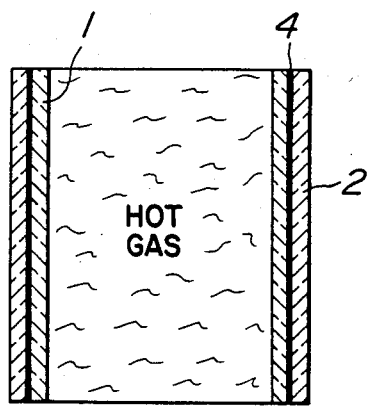

In another embodiment as shown in FIG. 3, a lubricating layer 4 can be inserted between the first ceramic member 1 adapted to be in contact with the inside hot gas and the second ceramic member 2 at the outer surface of the engine part, for the purpose of further reducing the theraml stress in the engine part. The lubricating member 4 can be made of a ceramic, a metal, or one or more of composite bodies of ceramics and metals. Ceramics which can be used for the lubricating layer 4 are ceramics with a high slidability such as boron nitride, talc, carbon, graphite, and the like are preferable, while preferable metals for the lubricating layer 4, in the form of a plated layer or a vapor deposited layer of a metal, are metals having a high hardness such as nickel (Ni), chromium (Cr), or iron (Fe), and metals with a low melting point such as aluminium (Al) or copper (Cu), or alloys thereof.

Figure 4:
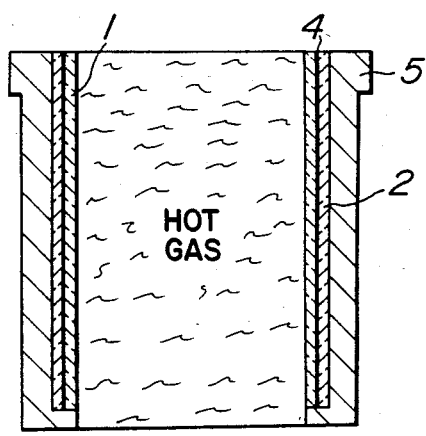

FIG. 4 shows another preferred embodiment of the invention which has a metallic member 5 such as a metallic sleeve, and the overlaid or laminated ceramic members are fitted therein. As apparent to those skilled in the art, the embodiment of FIG. 4 with a metallic sleeve or the like provides the engine part with a high mechanical strength.

As described above, the engine part of the invention has an overlaid or laminated structure made of a plurality of ceramic members, so that the first ceramic member in contact with the high-temperature gas and the second ceramic member secured to the back surface thereof can slide relative to each other along the contact surface therebetween. Thus, the thermal stresses generated in the juxtaposed ceramic members do not affect each other, and the thermal stress caused in the low-temperature portion of the ceramic members can be suppressed, there-by improving the thermal shock resistance of the heat insulating ceramic members or layers and preventing the ceramic members from being broken by thermal stress. Accordingly, it is important that, among the pluarlity of the ceramic members, the adjacent ceramic member slide relative to each other with little friction and without restricted each other, and the lubricating layer inserted between the adjacent ceramic layers as shown in FIGS. 3 and 4 is preferable because it enhances the sliding effects between the adjacent ceramic members. It is noted that the lubricating layer 4 can be inserted between the metallic member 5 and the overlaid or laminated ceramic structure instead of the position of the embodiment of FIG. 4, and the same sliding effects are described above can be achieved with the thus inserted lubricating layer 4.

The reason why the mechanical strength of the ceramic member is restricted to be more than 20 kg/mm² in the present invention is as follows; namely, it the mechanical strength is less than 20 kg/mm², a larger temperature difference cannot be achieved between a high-temperature portion and a low-temperature portion of the ceramic members without fracture of ceramic members by thermal stress even if the ceramic members are overlaid or laminated one on the other in the above-mentioned manner. Here, the "mechanial strength" refers to the fracture stress when a four-point bending load is applied to a test piece of 3 mm thickness, 4 mm width, and 40 mm length with an external span of 30 mm and an internal span of 10 mm, as defined by the Japanese Industrial Standard JIS R1601 "Testing Method of Bending Strength of Fine Ceramics".

The present invention will be described now in further detail by referring to examples.

Example 1

First and second ceramic members were prepared by using ceramic materials with the mechanical strengths as shown in Table 1. After machining the thus prepared members, each of the second ceramic members was heated at 100° C. for expansion, so as to fit the first ceramic member therein by shrinkage fitting. Whereby, samples No. 1 through No. 7 of the engine of the invention were formed, which were cylinders with the overlaid or laminated structure. Some of the samples has lubricating layers inserted between the first ceramic member and the second ceramic member. In the case of the nickel lubricating layer, a nickel coating of 0.05 mm thickness was plated on the outer surface of the first ceramic member prior to the above-mentioned shrinkage fitting, while in the case of the talc or boron nitride lubricating layer, a 0.5 mm thick coating of the lubricating layer material was applied by brushing. The samples No. 1 through No. 5 were engine parts having cast iron sleeves with a wall thickness of 7 mm, and the two-ceramics-layer laminated structures were fitted in the case iron sleeves by shrinkage fitting, while the samples No. 6 and No. 7 were engine parts made solely of the two-ceramics-layer structures. The engine parts thus prepared were assembled in Diesel engines, which were reciprocating piston engines, and the single-cylinder engine tests were carried out for 500 hours.

For comparison, reference samples No. 8 through No. 10 were prepared, which has a mechanical strength falling outside of the numerical limit of the present invention. Samples No. 11 and No. 12 having single-ceramic layer structures were also tested as examples of the prior art. Each of the samples No. 8 through No. 12 was an engine part having the ceramic members shrinkage fitted in a cast iron sleeve with a wall thickness of 7 mm. The result of the single-cylinder test is shown in Table 1.

As shown from the test results of Table 1, samples No. 1 through No. 7 representing the two-ceramics-layer laminated structure of the present invention with a mechanical strength of more than 20 kg/mm$^2$ proved that no irregularities or trouble resulted even after 500 hours of the single-cylinder test. On the other hand, in the case of the reference samples No. 8 and No. 10 and the prior art samples No. 11 and No. 12, cracks resulted in all of them in 10 to 50 hours after the beginning of the single-cylinder tests.

to be sandwiched between the first and third ceramic members in the final laminated structure. The first, second, and third ceramic members were overlaid one on the other so as to form a three-ceramics-layer laminated structure. The thus prepared laminated structure was fitted on the top portion of a cast iron piston with an outside diameter of 120 mm by shrinkage fitting, so as to provide a Diesel engine piston which was an engine part according to the present invention having a piston cap formed of a three-zirconia-layer laminated structure. The Diesel engine piston was tested by using a single-cylinder engine of 1,357 cc, and it was proved that it maintained normal operation without causing any cracks in the ceramic members even after 1,000 hours of running.

For comparison, a conventional Diesel engine piston having a single-ceramics-layer shrinkage fitted on the upper portion of a cast iron piston was prepared, which ceramic layer was made of zirconia and had a minimum thickness of 7 mm. Similar single-cylinder engine tests on the prior art sample showed generation of cracks in 30 hours after the start of the tests.

As described in the foregoing, the engine part of the present invention has an overlaid or laminated structure having a plurality of ceramic members with a high mechanical strength in excess of a specific value, e.g. 20 kg/mm$^2$, and a first ceramic member to be in contact with hot gas and a low-temperature second ceramic member overlaid on the outer or back surface of the first ceramic member can slide relative to each other along the joint surface therebetween, whereby the thermal stress generated in the low-temperature second ceramic member can be reduced and the ceramic members are protected from breakage due to such thermal stress. Thus, the engine part of the invention has not only a very high durability but also high heat resistance

TABLE 1

| Group | Sample No. | First ceramics member | | | Second ceramics member | | | Lubricating layer | Test result, with 1-cylinder engines |
|---|---|---|---|---|---|---|---|---|---|
| | | Material | Strength (kg/mm$^2$) | Thick (mm) | Material | Strength (kg/mm$^2$) | Thick (mm) | | |
| Invention | 1 | Zirconia | 60 | 2 | Zirconia | 60 | 2 | — | 500 hr no trouble |
| | 2 | Zirconia | 25 | 2 | Zirconia | 25 | 2 | Nickel | 500 hr no trouble |
| | 3 | SiN* | 50 | 5 | Zirconia | 25 | 3 | — | 500 hr no trouble |
| | 4 | Zirconia | 60 | 3 | Alumina | 25 | 5 | Talc | 500 hr no trouble |
| | 5 | Sialon | 30 | 5 | Zirconia | 60 | 3 | BN* | 500 hr no trouble |
| | 6 | Zirconia | 60 | 4 | Zirconia | 60 | 10 | — | 500 hr no trouble |
| | 7 | SiC* | 40 | 10 | SiN* | 60 | 5 | — | 500 hr no trouble |
| Reference | 8 | Mullite | 15 | 3 | Zirconia | 60 | 2 | — | crack after 50 hr |
| | 9 | Zirconia | 14 | 3 | Steatite | 12 | 3 | — | crack after 35 hr |
| | 10 | SiN* | 50 | 5 | Zirconia | 14 | 3 | — | crack after 30 hr |
| Prior art | 11 | Zirconia | 60 | 4 | | | | | crack after 15 hr |
| | 12 | Alumina | 35 | 5 | | | | | crack after 10 hr |

*Note:
SiN for silicon nitride, SiC for silicon carbide, BN for boron nitride

EXAMPLE 2

A zirconia plate with a mechanical strength of 60 kg/mm$^2$ was prepared as a first ceramic member to be in contact with hot gas, and the zirconia plate was machined into a disc with a diameter of 100 mm and a minimum thickness of 3 mm. The disc has a concave upper surface to be in contact with the hot gas and a flat lower surface not to be in contact with the hot gas. Second and third ceramic members were made from the same zirconia plate by machining it into discs having a diameter of 100 mm and a thickness of 2 mm with smooth upper and lower surfaces. Boron nitride coatings of 0.5 mm thickness were applied to the upper and lower surface of the second ceramic member which was and heat insulation which are inherent to the ceramic material. The engine part of the invention greatly improves the thermal efficiency and effectively saves energy when they are used as cylinders, cylinder heads, pistons, precombustion chambers, port liners or the like in various reciprocating piston engines such as Diesel engines and spark ignition engines. Therefore, engine parts manufactured according to the invention are very valuable from the standpoint of efficient use of energy.

Although the invention has been described with a certain degree of particularity, it is understood that the present disclosure has been made only by way of example and that numerous changes in details of construction and the combination and arrangement of constituent elements may be resorted to without departing from the scope of the invention as hereinafter claimed.

What is claimed is:

1. An engine part comprising:
 a plurality of ceramic members, a first ceramic member having a front surface and a back surface, said front surface contacting a hot gas; and
 a second ceramic member having a front surface and a back surface, said front surface of said second ceramic member being fittingly secured to said back surface of said first ceramic member by a means for permitting relative sliding therebetween at an operative temperature of the engine part, wherein each of said first and second ceramic members have mechanical strengths of greater than 20 Kg/mm$^2$.

2. The engine part as set forth in claim 1, wherein said first and second ceramic members are fitted in an inside portion of a metallic member.

3. The engine part as set forth in claim 1, wherein said means for permitting relative sliding comprises at least one lubricating layer inserted between said front surface of said second ceramic member and said back surface of said first ceramic member so as to facilitate sliding between said first and second ceramic members.

4. The engine part as set forth in claim 2, wherein said means for permitting relative sliding comprises at least one lubricating layer inserted between said front surface of said second ceramic member and said back surface of said first ceramic member so as to facilitate sliding between said first and second ceramic members.

5. The engine part as set forth in claim 1, wherein at least one of said first ceramic member and said second ceramic member comprises zirconia.

6. The engine part as set forth in claim 1, wherein said engine part forms at least one engine part from the group of parts consisting of a cylinder, a cylinder head, a piston, a precombustion chamber, and a port liner.

7. The engine part as set forth in claim 6, wherein at least one of said first ceramic member and said second ceramic member comprises zirconia.

8. The engine part as set forth in claim 1, wherein said mechanical strength is greater than 40 Kg/mm$^2$.

9. The engine part as set forth in claim 1, wherein said engine part forms at least one engine part from the group of parts consisting of a cylinder, a cylinder head, a piston, a precombustion chamber, and a port liner.

10. The engine part as set forth in claim 2, wherein said back surface of the second ceramic member is secured to said inside of said metallic member.

11. The engine part as set forth in claim 4, wherein said lubricating layer comprises a material selected from the group consisting of boron nitride, talc, carbon, graphite metals and composite bodies of metals and ceramics.

12. An engine part comprising:
 a plurality of ceramic members, a first ceramic member having a front surface and a back surface, said front surface contacting a hot gas; and
 a second member having a front surface and a back surface, said front surface of said second ceramic member being fittingly secured to said back surface of said first ceramic member by a means for permitting relative sliding therebetween at an operative temperature of the engine part, wherein each of said first and second ceramic members have mechanial strengths of greater than 30 Kg/mm$^2$ at 500° C.

13. The engine part as set forth in claim 12, wherein at least one of said first ceramic member and said second ceramic member comprises zirconia.

* * * * *